Sept. 15, 1931.   C. B. MIRICK   1,822,996
ELECTRICAL BALANCE CIRCUIT
Filed Dec. 3, 1927
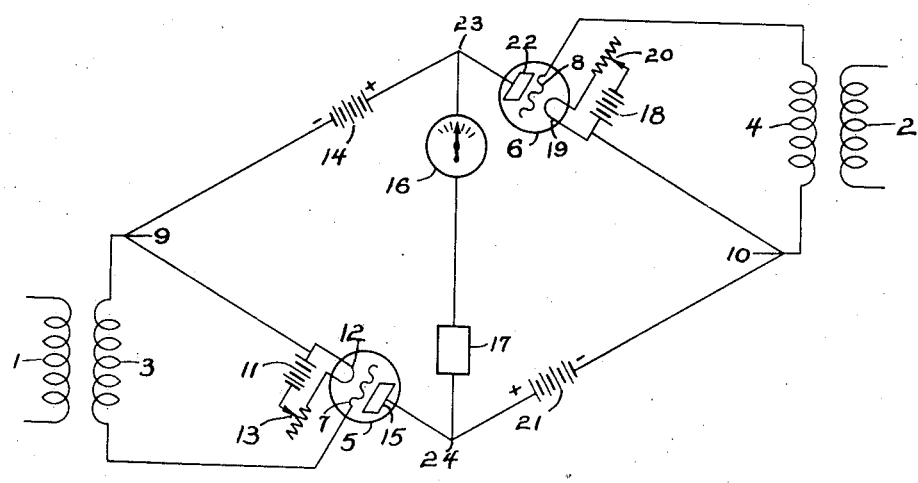
INVENTOR.
Carlos B. Mirick,
BY Harold Dodd.
ATTORNEYS.

Patented Sept. 15, 1931

1,822,996

UNITED STATES PATENT OFFICE

CARLOS B. MIRICK, OF WASHINGTON, DISTRICT OF COLUMBIA, ASSIGNOR, BY MESNE ASSIGNMENTS, TO FEDERAL TELEGRAPH COMPANY, A CORPORATION OF CALIFORNIA

ELECTRICAL BALANCE CIRCUIT

Application filed December 3, 1927. Serial No. 237,577.

My invention relates broadly to electrically balanced circuits and more particularly to differential relay circuits.

The object of my invention is to produce a differential relay circuit in which there is no current flowing when the currents in the various circuits are balanced.

A further object of my invention is to reduce the number of coils required in a differential relay and to so arrange the connections that the balancing of the currents flowing through the differential relay will be eliminated.

My improved balanced circuit can be utilized in any device or apparatus where it is desired to compare the relative intensity of alternating currents flowing in a plurality of circuits. However, for simplicity of description, I will describe it as applied to a differential relay but it is to be understood that such application is not intended to limit the use of my invention to that type of device only.

One of the difficulties encountered in the use of a differential relay now employed is the practical impossibility of producing a plurality of coils that have exactly the same characteristics so that equal currents or changes of currents in each will produce equal effects upon an armature.

Another difficulty encountered with the use of the modern relay is the fact that when a strong electric current flows through its coils and its armature is under the influence of the magnetic flux produced by that flow of current, the armature remains practically unaffected by slight changes in the flux produced by either coil.

In the differential relay that I have developed, I have eliminated these inherent disadvantages and produced a device in which the armature is under no electrical influence when the currents in the various circuits are balanced. When, however, the current in one circuit increases over the value of the currents flowing in the other circuits the moving elements of the indicating devices or armatures of the relay are affected by the flux set up in the coil rather than the differences in a plurality of fluxes produced by different coils.

Further objects of my invention will appear more fully hereinafter as the description of the method and apparatus is developed.

Reference is to be had to the accompanying drawing which diagrammatically represents the circuit diagram of my improved electrical balance in which numerals 1 and 2 designate the ouput coupling coils of the circuits in which the currents to be differentiated are flowing.

Numerals 3 and 4 represent the input coils of the differential relay, which constitutes a bridge system in two legs of which are inserted two vacuum tube amplifiers 5 and 6. The coils 3 and 4 are connected from the grids 7 and 8 of the vacuum tubes 5 and 6 to the neutral points 9 and 10 of the bridge system.

The point 9 serves as a common terminal for the low potential side of the source of filament current power 11 which supplies heating current for the filament 12 of the vacuum tube 5 through a variable resistance 13 preferably of the carbon pile type and for the low potential side of the source of plate current power 14 which supplies current to the plate 15 of the vacuum tube 5 through an ammeter or galvanometer 16 and a load 17. The load 17 may be a telephone, a relay or any other electrically operated device.

The point 10 serves as a common terminal for the low potential side of the source of filament current power 18 which supplies heating current for the filament 19 of the vacuum tube 6 through a variable resistance 20 preferably of the carbon pile type, and for the low potential side of the source of plate current power 21 which supplies current to the plate 22 of the vacuum tube 6 through the load 17 and the ammeter or galvanometer 16.

It is to be noted that the plate-filament circuits of each of the vacuum tubes 5 and 6 have the portions between the high potential points 23 and 24 in common so that should the amount of current flowing in each circuit be equal to the other the resultant current flowing in the portion 23—24 would be zero. Should then there be any relative change in the current flowing in the coils 1 and 2 there would be induced in the section 23—24 a flow of current in the plate-filament circuit of the vacuum tube coupled to that coil. This current would then operate the load 17 depending upon the direction of flow of the current in the portion 23—24 and produce a differential action of a relay if such were the instrument substituted in the place of the load 17.

It will be understood that the above description and accompanying drawings comprehend only the general and preferred embodiment of my invention and that minor detail changes in the construction and arrangement of parts may be made within the scope of the appended claims without sacrificing any of the advantages of my invention.

Having thus described my invention what I claim is:—

1. In a balanced circuit, the combination of a pair of vacuum tubes having filament heating circuits, grid-filament and plate-filament circuits, an input coil disposed within each of the grid-filament circuits, the plate-filament portion of each vacuum tube forming a leg of a bridge circuit, a source of plate current power for each of said vacuum tubes, each of said sources forming a leg of said bridge circuit and an indicating device connected between the plate electrodes of said vacuum tubes, said indicating device consisting of a relay.

2. In a balanced circuit, the combination of a plurality of sources of power, a plurality of three electrode vacuum tubes and circuits therefor, said sources of power and vacuum tubes arranged alternately to form an electrical bridge having high potential and low potential points, a plurality of input coils, each of said coils having one terminal connected to a separate low potential point and the other terminal connected to the grid of the corresponding vacuum tube, the plate electrode of each vacuum tube connected to its corresponding high potential point and means responsive to the flow of electric current located between the two high potential points.

3. In a balanced circuit, the combination of a plurality of sources of power, a plurality of three electrode vacuum tubes and circuits therefor, said sources of power and vacuum tubes arranged alternately to form an electrical bridge having high potential and low potential points alternately arranged around said bridge, a plurality of input coils, each of said coils having one terminal connected to one low potential point and the other terminal connected to the grid of the corresponding vacuum tube, the plate electrode of each vacuum tube connected to its corresponding high potential point and means responsive to the flow of electric current located between the two high potential points.

4. In a balanced circuit, the combination of a plurality of sources of power, a plurality of three electrode vacuum tubes and circuits therefor, said sources of power and vacuum tubes arranged alternately to form an electrical bridge having high potential and low potential points alternately arranged around said bridge, a plurality of input coils, each of said coils having one terminal connected to one low potential point and to the filament electrode of its corresponding vacuum tube and the other terminal connected to the grid of the corresponding vacuum tube, the plate electrode of each vacuum tube connected to its corresponding high potential point and means responsive to the flow of electric current located between the two high potential points.

5. In a balanced circuit, the combination of a plurality of sources of power, a plurality of three electrode vacuum tubes and circuits therefor, said sources of power and vacuum tubes arranged alternately to form an electrical bridge having high potential and low potential points alternately arranged around said bridge, a plurality of input coils, each of said coils having one terminal connected to one low potential point and to the filament electrode of its corresponding vacuum tube and the other terminal connected to the grid of the corresponding vacuum tube, the plate electrode of each vacuum tube connected to its corresponding high potential point and means responsive to the flow of electric current located between the two high potential points, the plate-filament circuit of each of said vacuum tubes consisting of the connection from the filament of said vacuum tube through the low potential point of the bridge, the source of plate current power, one of the high potential points of the bridge, through said indicating device to the plate of said vacuum tube.

6. In a balanced circuit, the combination of a plurality of sources of power, a plurality of three electrode vacuum tubes and circuits therefor, said sources of power and vacuum tubes arranged alternately to form an electrical bridge having high potential and low potential points alternately arranged around said bridge, a plurality of input coils, each of said coils having one terminal connected to one low potential point and to the filament electrode of its corresponding vacuum tube and the other terminal connected to the grid of the corresponding vacuum tube, the plate electrode of each vacuum tube connected to its corresponding high potential point and means responsive to the flow of electric current located between the two high potential points, the plate-filament circuit of each of said vacuum tubes consisting of the connection from the filament of said vacuum tube through the low potential point of the bridge, the source of plate current power, one of the high potential points of the bridge, through said indicating device to the plate of said vacuum tube, the plate-filament circuits of each of said vacuum tubes connected through the indicating device in alternate directions.

7. In a balanced circuit, the combination of a plurality of vacuum tubes having filament heating circuits, grid-filament and plate-filament circuits, an input coil disposed within each of the grid-filament circuits, the plate-filament circuit of each vacuum tube constituting a leg of an electrically balanced bridge, a source of plate current power disposed in each of opposite legs of the electrically balanced bridge, a portion in common with corresponding portions of both plate-filament circuits, and an indicating device disposed within the common portion, said common portion of the plate-filament circuits carrying substantially no current when the plate currents of each of said vacuum tubes are equal.

CARLOS B. MIRICK.